United States Patent [19]

Duyvesteyn et al.

[11] Patent Number: 5,292,490
[45] Date of Patent: Mar. 8, 1994

[54] RECOVERY PLATINUM GROUP METALS FROM OXIDES ORES

[75] Inventors: Willem P. C. Duyvesteyn, San Jose; Houyuan Liu, Sunnyvale, both of Calif.; Saskia Duyvesteyn, Cambridge, Mass.

[73] Assignee: BHP Minerals International Inc., Reno, Nev.

[21] Appl. No.: 896,675

[22] Filed: Jun. 10, 1992

Related U.S. Application Data

[63] Continuation-in-part of Ser. No. 845,068, Mar. 3, 1992.

[51] Int. Cl.$^5$ .................. C01G 55/00; C22B 11/00
[52] U.S. Cl. .................................. 423/22; 423/27
[58] Field of Search .............. 423/22, 27, 38, 41

[56] References Cited

U.S. PATENT DOCUMENTS

| | | | |
|---|---|---|---|
| 732,708 | 7/1903 | Cassel | 423/37 |
| 2,283,198 | 5/1942 | Fink et al. | 423/38 |
| 4,571,263 | 2/1986 | Weir et al. | 423/27 |
| 4,936,910 | 6/1990 | Dadgar et al. | 423/27 |

FOREIGN PATENT DOCUMENTS 17033 of 1887 United Kingdom .................. 423/38

*Primary Examiner*—Michael Lewis
*Assistant Examiner*—Steven Bos
*Attorney, Agent, or Firm*—Hopgood, Calimafde, Kalil, Blaustein & Judlowe

[57] ABSTRACT

A method is provided for recovering at least one platinum group metal from an ore containing the same. The method comprises reducing the particle size of the ore to provide the platinum group metal in a leachable condition following which the ore is subjected to leaching with a sulfuric acid solution maintained at a pH of less than 1 during leaching. The solution contains an amount of a soluble bromide compound at least sufficient to complex the platinum group metal while maintaining an amount of an oxidizing agent dissolved in the solutions at least sufficient to maintain the platinum group metal in an ionic form conducive to forming a soluble bromide complex, thereby dissolving substantial amounts of the platinum group metal.

11 Claims, 5 Drawing Sheets

RECOVERY PLATINUM GROUP METALS FROM OXIDES ORES

This application is a continuation-in-part of U.S. application Ser. No. 845,068, filed Mar. 3, 1992, the subject matter of which is incorporated herein by reference, said application relating to the dissolution of platinum group metals selected from the group consisting of platinum, palladium, rhodium and ruthenium.

This invention relates to the recovery of precious metals from oxide ores containing platinum group metals (PGM).

BACKGROUND OF THE INVENTION

General speaking, the dissolution and recovery of platinum group metals (PGM's), was thought to be possible only by the use of aggressive chemicals. A well known process is dyanide dissolution or platinum group metals.

Dissolution of platinum group metals with a cyanide solution, e.g., sodium cyanide solution, is relative easy, particularly the dissolution of PGM's in their elemental state to form cyano-complexes that are stable in aqueous solutions. However, if PGM's exist in mineral form, such as in oxide ores, it may be necessary to liberate the precious-metals, for example, by converting them into their elemental states or other soluble form before dissolving them with a cyanide solution.

A disadvantage of cyanide dissolution is that it presents environmental problems and particular care must be taken in disposing of waste solutions. Moreover, cyanides are costly materials which make their use economically undesirable.

Another aggressive chemical employed to dissolve precious metals is aqua regia. Aqua regia insures dissolution of PGM's, because of its high acidity, its high redox potential (due to the presence of nitric acid), and its high concentration of complexing ions (12M chloride ions) for complexing the precious metals.

However, the use of aqua regia has its economic disadvantages because of its unacceptable high reagent use, cost and consumption.

A process has been reported regarding the use of bromine for leaching gold from ores. It was found that a relatively low bromide ion concentration can be used to effect dissolution of elemental gold, for example, 0.1M bromide ions, as compared to the much higher chloride ion concentration (12M chloride ions) required for dissolution with aqua regia.

In this connection, reference is made to an article by Batric Pesic et. al. entitled Dissolution of Gold with Geobrom 3400, Fundamental and Applied Studies, which was delivered at the Proceedings of the 13th IMPI Conference at Montreal Precious Metals 1989.

Geobrom 3400 (which is the trademark of a product of Great Lake Chemical Corporation) is a solution containing about 34% free bromine. According to the aforementioned article, the bromine solution was used to dissolve elemental gold from gold concentrates and electronic scrap. Rotating disc studies were conducted using a rotator, a speed controller, a reactor, and a water bath. A typical experiment comprised a 500 ml solution containing 5 ml/l of Geobrom 3400 at a natural pH at a temperature of 250° C., the stirring being carried out at 500 rpm.

The studies indicated that bromine provided a substantially higher rate of gold dissolution than dissolution with sodium cyanide or thiourea.

The use of bromine for the dissolution of gold is disclosed in another article entitled Leaching and Recovery of Gold From Black Sand Concentrate and Electrochemical Regeneration of Bromine by A. Dadgar et. al. This article was presented before the Society for Mining, Metallurgy, and Exploration, Inc. at Reno, Nev. on Sep. 10–12, 1990. This paper describes the leaching of gold with Geobrom 3400 from very rich black sand concentrate and its subsequent recovery by ion exchange resins and solvent extraction.

Mineralogical examinations of PGM in ores generally reveal native metals, sulphides, tellurides, arsenides and antimonides, etc., associated with base metal sulphides as occlusions, intergrowths and solid solution in gabbroic rocks. In South Africa over 20 PGM minerals have been identified, the most common of which are sperrylite ($PtAs_2$), cooperite (PtS), braggite ((Pt, Pd, Ni) S), and a Pt—Fe alloy. Braggite, vysotskite (PdS) and Pt-Fe alloys are common in an ore known as the Stillwater ore, while Sudburyite (PdSb) is found in Kambalda and Sudbury ores. In the more oxidized Coronation Hill and alluvial deposits the majority of the PGM is present as native Pt and Pd, sometimes alloyed with Fe, associated with the heavier minerals such as magnetite and milenite.

A particular ore of interest is an oxide ore referred to as The Hartley Complex of the Great Dyke in Zimbabwe. Estimates of the value of all Great Dyke ore bodies indicate that it contains approximately 800 million ounces of platinum and 19 million ounces of rhodium. However, since 9% of the ore is oxidized and cannot be processed with current recovery methods, it is discarded as waste which represents a loss of many millions of dollars.

The ore contains at least one precious metal, especially platinum, selected from the group consisting platinum group metals, gold and silver, some in the elemental form, but usually in the form of a precious metal compound selected from the group consisting of sulfides, arsenides, tellurides, selenides, antimonides, and bismuthinides, or as a ferro-alloy of the precious metal, e.g., Pt—Fe alloy. Other ores include certain gold ores containing carbon, generally referred to as refractory ores.

Because the PGM content of the Hartley ore is quite low, mineralogical investigations were carried out on samples concentrated either by shaking table or heavy liquid separation. Mineralogically, the ore contains PGM'S, silicate gangue minerals, oxides and base metal (BM) sulfides. The ore minerals, making up less than 0.01 vol. % of the ore, constitute silicate gangue minerals with the remainder of the ore made up of oxides and BM sulfides.

The gangue minerals consists primarily of hydrated silicates, talc being the main component. Substantial amounts of tremolite, serpentine and chlorite are present. The mineral oxides comprise iron (II) oxide, ilmenite, chromite and wolframite, while the sulfides comprised pyrrhotite (FeS), chalcopyrite ($CuFeS_2$) and pentlandite (FeNiS).

We have discovered a method for the recovery of PGM's from ores of the aforementioned types by simply using a sulfuric acid solution relatively low in halide concentration and of controlled redox potential at least sufficient to convert the precious metal to an ionic form conducive to forming a soluble bromide complex thereof.

OBJECTS OF THE INVENTION

One object of the invention is to provide an aqueous sulfuric acid solution containing sufficient bromide ions to effect the dissolution PGMs, from oxide ore.

Another object of the invention is to provide a method for the recovery of platinum group metals from ores.

These and other objects will more clearly appear from the appended drawings, the following disclosure and the claims.

SUMMARY OF THE INVENTION

Figure 1:
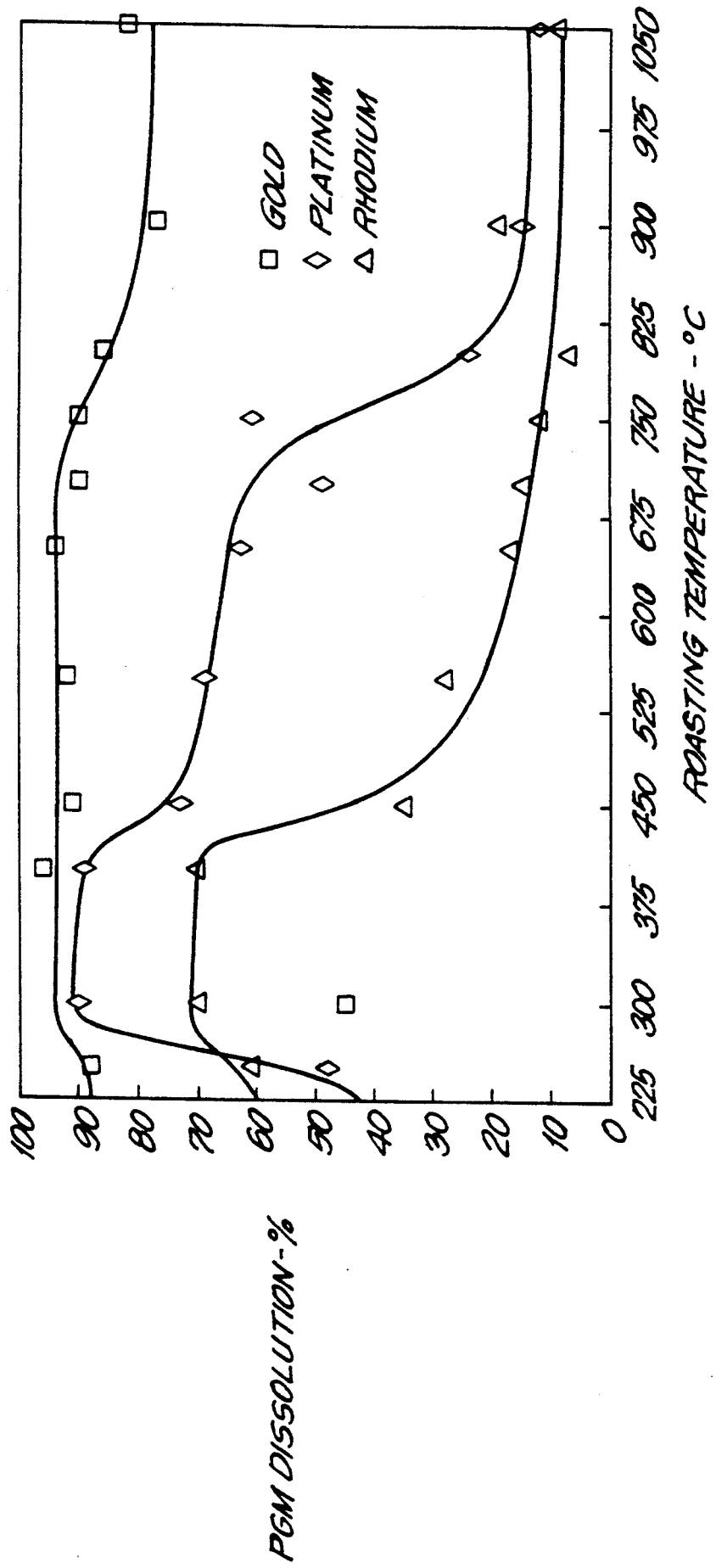
FIG. 1 depicts a set of curves showing the effect of roasting temperatures on PGM dissolution.

Stating it broadly, the invention is directed to a method for recovering at least one platinum group metals selected from the group consisting of platinum, palladium, rhodium and ruthenium from an oxide ore in which the at least one platinum group metal is disseminated throughout the ore in the elemental state and/or usually in the form of at least one platinum group metal compound selected from the group consisting of sulfides, arsenides, tellurides, selenides, antimonides, and bismuthinides, and also including ores containing carbon.

The method comprises first providing said ore in a particulate state such as by grinding to less than 100 mesh (US-Standard), and thereby provide said platinum group metal in a leachable form and then subjecting the particulate ore to leaching with a sulfuric acid solution maintained at a pH of less than about 1 during leaching. The solution contains an amount of a soluble bromide compound at least sufficient to form a soluble precious metal bromide complex while maintaining an amount of dissolved oxidizing agent, e.g., bromine, in the solution at least sufficient to maintain the precious metal in an ionic form conducive to forming a soluble bromide complex, thereby enabling the dissolution of substantial amounts of at least one of said precious metals from said ore.

Depending upon the type of ore being treated, it may be necessary to subject the ore to a pretreatment to liberate occluded platinum group metal and put it in a leachable form to permit the dissolution thereof. This is usually required where the platinum group metal is contained in an ore as a metal compound, such as ores containing platinum arsenide minerals and the like. Generally, a simple roasting procedure may be employed to break down the minerals and liberate the precious metals. Another method is to subject the ore to pressure oxidation in an aqueous solution, e.g. sulfuric acid solution, confined in an autoclave.

The solution employed for the dissolution of platinum group metals following liberation is basically a sulfuric acid solution containing an oxidizing agent and bromide ions in amounts sufficient to form a soluble complex of the platinum group metals. Sulfuric acid can be produced in situ from the oxidation of base metal sulfides present in the ore.

As stated above, the amount of bromide ions in the sulfuric acid solution is at least sufficient to form a soluble complex with the platinum group metal, a stoichiometric excess of the bromide ions being preferred, for example, at least 0.001M excess. The amount of oxidizing agent in the solution is at least sufficient to maintain a redox potential (ORP) at least high enough, e.g., at least about 700 mV, and preferably at least about 800MV, as determined against a standard calomel electrode (SCE), to convert the platinum group metal to an ionic form conducive to forming a soluble bromide complex with the bromide ions.

The bromide ion concentration preferably ranges from about 0.1 to 0.5 molar. Examples of bromide compounds suitable for carrying out the invention include alkali and alkaline earth metal bromides, sodium bromide being preferred.

Bromine is preferred as the oxidizing agent. Bromine exists in the liquid form and has a density of about 3.12 g/ml at 20° C. It boils at 58.8° C. It is generally available dissolved in a solution of sodium bromide, a commercial grade being known as Geobrom 3400, the solution containing by weight about 34% of elemental bromine as $Br_2$, about 14.3% NaBr, about 6.25% NAOH and about 45.45% water, the density being about 1.8 grams/cc.

DETAILS OF THE INVENTION

As illustrative of the invention as applied to various precious metal-containing materials, the following examples are given.

EXAMPLE 1

Dissolution tests were conducted on an oxide ore, namely, the Hartley oxide ore mined at the Hartley site in Zimbabwe referred to hereinabove. The chemical composition of this ore in the natural and the roasted state is given in following Table 1 below. The oxide ore in the natural state is designated as NOX-C and in the roasted state as NOXR-C. Such oxide ores may contain at least one compound selected from the group consisting of sulfides, arsenides, tellurides, selenides, antimonides and bismuthinides.

TABLE 1

| Element | NOX-C | NOXR-C |
| --- | --- | --- |
| % Al | 2.19 | 2.34 |
| % Ca | 2.33 | 2.43 |
| % Fe | 9.81 | 10.1 |
| % K | 0.23 | 0.25 |
| % Mg | 13.2 | 14.1 |
| % Na | 0.21 | 0.25 |
| ppm Ag | 1.0 | 0.8 |
| ppm As | 42 | 38 |
| ppm Au | 0.75 | 0.81 |
| ppm Ba | 38 | 40 |
| ppm Be | 0.9 | 0.9 |
| ppm Bi | 11 | 38 |
| ppm Cd | 10 | 17 |
| ppm Ce | 7 | 8 |
| ppm Co | 148 | 156 |
| ppm Cr | 1640 | 1740 |
| ppm Cu | 1790 | 1890 |
| ppm Ga | 14 | 16 |
| ppm In | 3 | <2 |

TABLE 1-continued

| Element | NOX-C | NOXR-C |
|---|---|---|
| ppm La | <2 | <2 |
| ppm Mn | 1660 | 1760 |
| ppm Mo | 8 | 7 |
| ppm Nb | 17 | 14 |
| ppm Ni | 3400 | 3600 |
| ppm P | 240 | 255 |
| ppm Pb | 9 | 14 |
| ppm Pd | 1.42 | 1.60 |
| ppm Pt | 5.13 | 5.42 |
| ppm Rb | 12 | 12 |
| ppm Rh | 0.31 | 0.35 |
| ppm Sb | <5 | <5 |
| ppm Sc | 19.9 | 20.8 |
| ppm Sn | <5 | <5 |
| ppm Sr | 27 | 27 |
| ppm Th | 19 | 15 |
| ppm Ti | 990 | 965 |
| ppm Tl | <2 | <2 |
| ppm V | 148 | 154 |
| ppm W | <5 | <5 |
| ppm Y | 3.3 | 3.5 |
| ppm Zn | 79 | 92 |
| ppm Zr | 11 | 10 |

The ore was ground to provide a particle size distribution in which 92% was less than 38 micron. This particular size contained the bulk of the precious metals as will be clearly apparent from Table 2 below.

TABLE 2

| | Particle Size | | |
|---|---|---|---|
| Element | <38 μm | 38-75 μm | 75-150 μm |
| Gold Assay | 0.55 ppm | 0.42 ppm | 0.25 ppm |
| Platinum Assay | 3.90 ppm | 1.74 ppm | 0.17 ppm |
| Rhodium Assay | 0.3 ppm | 0.1 ppm | 0.0 ppm |
| Gold Distribution | 89.8% | 10.0% | 0.2% |
| Platinum Distribution | 93.9% | 6.1% | 0.0% |
| Rhodium Distribution | 95.4% | 4.6% | 0.0% |

Roasting tests which were conducted at a temperature ranging from 1500° C. to 10500° C. indicated that a temperature in the range of about 2750° C. to 5500° C. was preferred. (Note FIG. 1) In one test, the ore was subjected to an oxidizing roast of 550° C. for one hour in a muffle furnace in the presence of air. About 50 grams of the roasted ore was slurried at 700° C. in 210 ml of solution containing 2N $H_2SO_4$ (100 gpl), 2.2 grams NaBr (0.1N) and 0.29 ml of Geobrom 3400 containing 344 bromine. The Geobrom 3400 had a density of about 1.8 g/c.c. The 50 grams of the ore calculated to 240 gpl, the amount of bromine per liter being about 0.84 gram which corresponds to about 0.0053 molar.

Over 70% of the platinum was dissolved in 120 minutes as indicated in Table 3 below, the test having been conducted for 3 hours.

TABLE 3

| Time | 0 min | 15 min | 30 min | 45 min | 60 min | 90 min | 2 hr | Residue ppm |
|---|---|---|---|---|---|---|---|---|
| ORP (mV) | 860 | 850 | 855 | 840 | 834 | 827 | 817 | |
| Acidity (N) | 2.0 | 1.57 | 1.38 | 1.32 | 1.27 | 1.20 | 1.20 | — |
| Geobrom (ml) | 0.29 | — | — | — | — | — | — | |
| Pt ppm | — | 0.65 | 0.87 | 0.98 | 0.89 | 0.97 | 0.94 | 1.65 |
| % Pt Dissol | — | 43% | 61% | 72% | 68% | 77% | 78% | 78% |

The redox potential (ORP) was in excess of 800MV (determined against a standard calomel electrode) during two hours of dissolution.

The consumption of Geobrom 3400 calculated to about 3.1 kg/ton of ore. The residue weight following completion of platinum dissolution was 41.3 grams.

EXAMPLE 2

The oxide ore was roasted at 3000° C. for one hour in a muffle furnace in the presence of air. Following completion of roasting, 50 grams of the roasted ore (804 minus 400 mesh) was slurried in 210 ml of sulfuric acid (100 gpl), i.e., approximately 2N, at 700° C. for upwards of 3 hours.

The solution contained 43 grams of NaBr or about 204.8 gpl (2N) and a total of 3 ml of Geobrom which calculates to about 5.4 grams per 210 ml of solution or 26.2 grams of Geobrom per liter. The amount of free bromine is about 8.9 gpl which corresponds to about 0.055 molar.

The results are shown in Table 3A below.

TABLE 3A

| Time | 0 min | 15 min | 30 min | 1 hr | 2 hr | 3 hr | Residue |
|---|---|---|---|---|---|---|---|
| ORP (mV) | 764 | 780 | 782 | 784 | 786 | 787 | N.A. |
| Acidity (N) | 2.0 | 1.4 | 1.2 | 1.2 | 1.0 | 0.85 | N.A. |
| Geobrom (ml) | 2.0 | 1.0 | — | — | — | — | N.A. |
| Au ppm | — | 0.29 | 0.30 | 0.29 | 0.29 | 0.26 | 0.03 |
| % Au Dissol | — | 64% | 72% | 79% | 80% | 99% | 99% |
| Pt ppm | — | 1.22 | 1.13 | 1.09 | 1.05 | 0.83 | 0.57 |
| % Pt Dissol | — | 81% | 82% | 90% | 96% | 86% | 92% |
| Rh ppm | — | 0.06 | 0.06 | 0.06 | 0.03 | 0.05 | — |
| % Rh Dissol | — | 72% | 75% | 78% | 48% | 83% | — |

The redox potential ranged from about 764 to 784 mV over a three hour period.

The gold dissolution was close to 100%.

The platinum dissolution efficiency was over about 95% and that for rhodium over 704. The Geobrom consumption was 108 kg/ton ore. This amount of reagent is not required as is evident from Example 1. The amount of elemental bromine calculates to about 36.7 kg/ton ore.

EXAMPLE 3

Another batch of ore was roasted at 5500° C. for 1 hour in a muffle furnace. The roasted ore (83 grams, 80% minus 400 mesh) was leached at 700° C. in 210 ml of 2N $H_2SO_4$ solution containing 0.42 gram NaBr (0.02N) and 0.04 ml Geobrom. The dissolution efficiency of both platinum and rhodium was somewhat low, i.e., below 504, thus indicating that the amount of bromide employed was not sufficient. The amount of Geobroin consumed was ¼ kg/ton ore. The amount of bromine calculated to about 0.343 gpl or about 0.002 molar.

The redox potential ranged from 890 to 916Mv.

EXAMPLE 4

In this example, the oxide ore was roasted in air for 0.5 hour at 3000° C. in a rotary kiln. The ore particle size wag at least 92% minus 400 mesh. The roasted ore (50 grams) was leached at 700° C. in 210 ml of solution containing about 100 gpl $H_2SO_4$ or approximately 2N and containing 10 gpl NaBr or 0.1N. The total amount of Geobrom used was 0.69 ml or 1.29 which corresponds to about 0.42 gram bromine in 210 ml of solution or about 2 gpl bromine (0.0125M).

The total consumption of Geobrom was 24.9 kg/ton ore. The redox potential fell within the range of 800 to 830 mV.

The results obtained are shown in Table 4 below:

TABLE 4

| Element | Feed (ppm) | Residue (ppm) | % Recovery |
| --- | --- | --- | --- |
| Gold | 0.75 | 0.08 | 91% |
| Platinum | 5.38 | 1.79 | 71% |
| Rhodium | 0.31 | 0.14 | 60% |

After 3 hours of leaching, the recovery in percent by weight was gold 914, platinum 71% and rhodium 60%.

EXAMPLE 5

A batch of the oxide ore was roasted in a rotary kiln at 4500° C. for 0.25 hour followed by leaching 50 grams (ore ground to 92% smaller than 400 mesh) of the ore at 700° C. in 210 ml of solution containing 100 gpl $H_2SO_4$ (about 2N) , 2.2 g NaBr (10 gpl or about 0.1N) and a total of about 0.44 ml of Geobrom. The Geobrom consumption was 15.3 kg/ton ore.

After 3 hours of leaching, the dissolution efficiency was as follows: gold 88%, platinum 59% and rhodium 22%. The redox potential during dissolution ranged from about 800 to 824 mV.

The decrease in dissolution efficiency appears to be related to the shortness of roasting time of 0.25 hour, thus indicating that the precious metals had not been sufficiently liberated as will be clearly apparent from the following example.

EXAMPLE 6

The oxide ore was roasted at 400° C. for 1 hour in a rotary kiln. The roasted ore (ground to 92% smaller than 400 mesh) was leached at 700° C. in 210 ml sulfuric acid solution containing 100 gpl $H_2SO_4$ (approximately 2N) , the amount of roasted ore being 50 grams. The solution also contained 2.2 g NaBr (10 gpl) and a total of 0.26 ml of Geobrom or about 0.47 g in 210 ml of solution, which corresponds to 2.24 gpl of Geobrom (0.76 gpl bromine or 0.00475 molar).

The Geobrom consumption was 9.0 Kg/ton ore or 3.1 Kg bromine per ton.

The redox potential during 3 hours of leaching ranged from about 801 to 833 mV. The dissolution efficiency was markedly improved over that of Example 5 with gold 96%, platinum 89% and rhodium 70%.

EXAMPLE 7

A batch of the oxide ore was roasted in air at 350° C. for one hour in a rotary kiln.

About 50 grams of the ore (92% smaller than 400 mesh) was leached in 210 ml sulfuric acid solution containing 100 gpl $H_2SO_4$, 2.2 g NaBr (10 gpl) and a total of 0.57 ml of Geobrom or 1.026 g which corresponds to 4.75 gpl (1.62 gpl bromine or 0.01 molar).

Good dissolution was achieved with gold 92%, platinum 61% and rhodium 62%.

The Geobrom consumption was 19.8 Kg/ton or 6.73 Kg. bromine per ton of ore.

EXAMPLE 8

The ore was roasted at 6500° C. for 1 hour in a rotary kiln in an atmosphere of air.

50 grams of the ore was slurried in 210 ml of solution containing 100 gpl $H_2SO_4$ (about 2N) , 2.2 g NaBr (10 gpl) and 0.09 ml Geobrom (or 0.162 g).

Following 2 hours of leaching at 700° C., 89 of gold was dissolved and 66% platinum. Less than it rhodium was dissolved.

The Geobrom consumption was 3.7 Kg/ton of ore.

To assure optimum dissolution of platinum group metals from the ore, the roasting temperature should be controlled over the range of about 2750° C. to 7500° C., more preferably, over the range of about 275° C. to 450° C.

As illustrative of the foregoing, the following examples are given:

EXAMPLE 9

The ore was roasted at 10500° C. for 1 hour. Following roasting, the ore which had a particle size of at least 92% through 400 mesh was subjected to leaching at 70° C. in which 50 grams of the ore was slurried in 210 ml of a solution containing 100 gpl $H_2SO_4$, 2.2 g NaBr and a total of 0.16 ml Geobrom (about 0.29 g bromine).

After leaching for upwards of 2 hours, only 15% of platinum was dissolved and about 11% rhodium. The amount of gold dissolved was 53%.

The amount of Geobrom consumed was 5.1 Kg/ton ore or 1.7 Kg bromine per ton. The redox potential ranged from 806 to 825 mV.

EXAMPLE 10

In this example the ore had been roasted at 8500° C. for 1 hour. The particle size of the ore was at least 92% through 400 mesh.

50 grams of the ore was slurried in 210 ml of solution containing 2.2 g NaBr (10 gpl), 100 gpl $H_2SO_4$ and a total of 0.12 ml Geobrom (about 0.22 g).

The ore was leached at 70° C. for upwards of 2 hours. Only 19% platinum was dissolved and less than 1% rhodium.

The effect of roasting temperature on PGM dissolution is illustrated by the curves for gold, platinum and rhodium in FIG. 1.

With respect to gold recovery, the temperature is not critical. However, with respect to platinum and rhodium, peak recoveries are obtained between about 2750° C. and about 4500° C. With respect to platinum, the roasting temperature may range from about 275° C. to 750° C.

Figure 2:
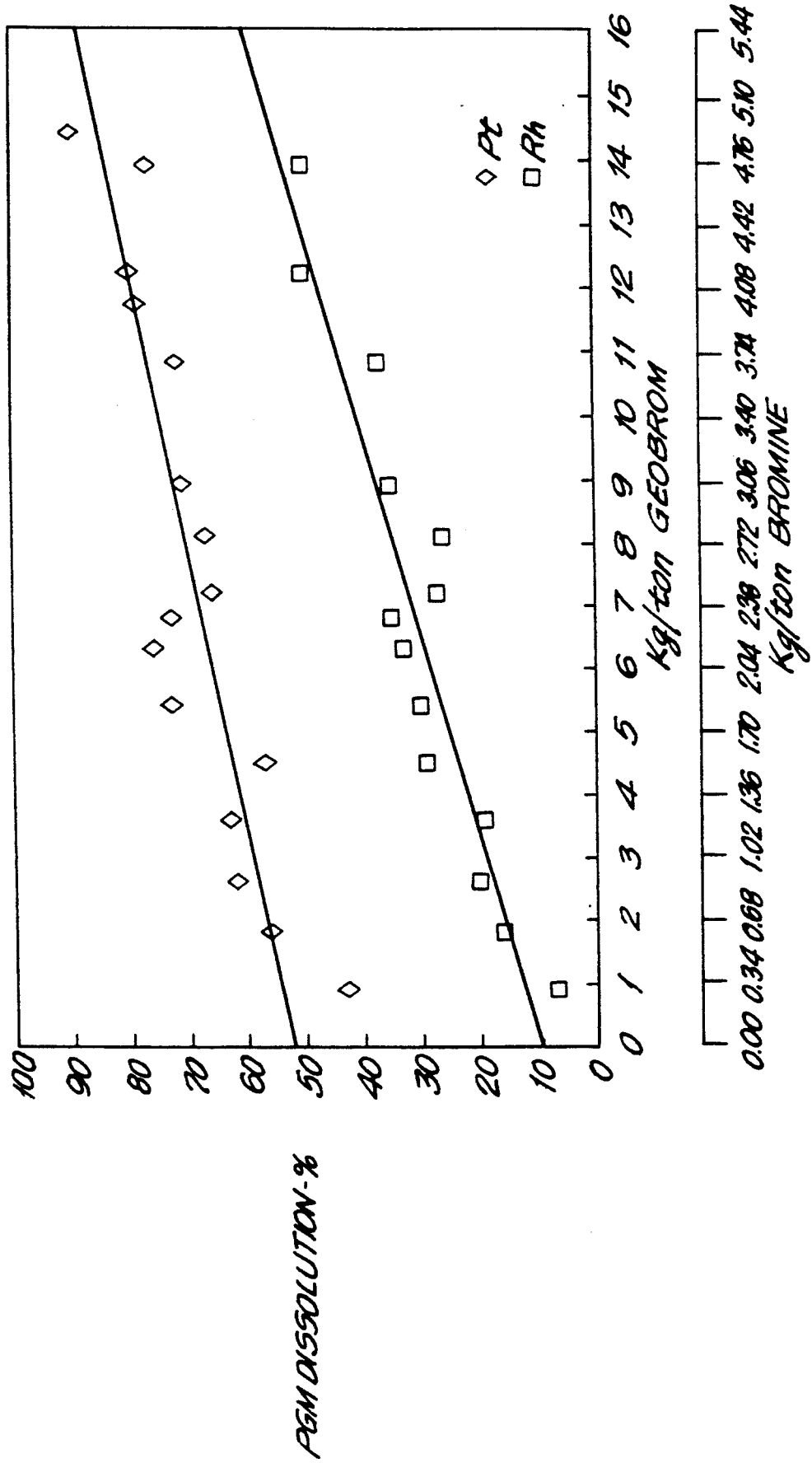
FIG. 2 illustrates the extent of PGM dissolution from the ore as a function of bromine consumption through the use of Geobrom.

Reference is made to FIG. 2 which shows PGM dissolution as a function of Geobrom consumption in Kg/ton ore. The corresponding amount of bromine is given below the Geobrom amounts. As will be noted, platinum has the highest recovery compared to rhodium.

Since platinum is the chief metal of interest, it is preferred that the amount of Geobrom consumed be at least sufficient to assure 50% or more dissolution of platinum by weight.

Preferably, the amount of Geobrom consumed should be at least about 2 Kg/ton or about 0.7 Kg bromine per ton. More preferably, the amount of Geobrom should be at least 3 Kg/ton of ore (or about 1 Kg bromine per ton of ore).

As stated herein, the ore can also be oxidized in an aqueous solution under high pressure in an autoclave. This method is well known in the prior art. Examples of high pressure oxidation and leaching in an autoclave appear in U.S. Pat. No. 4,012,484, No. 4,044,096, No.

4,093,526, No. 4,130,626, among others. An example of high pressure oxidation is given below:

EXAMPLE 11

This example illustrates the use of an autoclave for oxidizing the ore prior to the extraction of precious metals therefrom.

The particulate ore is slurried in an aqueous sulfuric acid solution containing about 100 g/l $H_2SO_4$ and the slurry digested in an autoclave at a temperature of about 2500° C. and an elevated pressure of about 600 psig in the presence of an oxidizing gas, e.g. air, oxygen, etc., for about 2 hours.

The base metal compounds, such as sulfides, arsenides, etc., are oxidized to provide a solution containing substantially said base metals and a residue containing liberated precious metals.

The residue is separated from the solution and then treated similarly as in Example 2 for the recovery of precious metals therefrom.

In summary, the following parameters have been determined from the test data to yield recoveries of gold 90%, platinum 85% and rhodium 70%.

| Roasting: | |
|---|---|
| temperature | 300 to 700° C. |
| time | 60 to 90 minutes |
| atmosphere | air with residual oxygen |
| oven type | rotary kiln |
| flow rate | 2 L/min |
| Leaching: | |
| temperature | 70° C. |
| time | 2 hours |
| sulfuric acid | 100 g/L |
| sodium bromide | 10 g/L |
| ORP (Geobrom 3400) | >800 mV |
| solid concentration | 240 g/l or 400 g/l |

The amount of Geobrom (34% by weight bromine) should be sufficient to assure a redox potential of at least about 800 mV.

In terms of molar concentration the amount of bromine should be at least about 0.005M, preferably at least about 0.01M.

Generally speaking the bromine molar concentration may range from about 0.005M to 0.05M.

Recovery of Platinum From The Leach Solution

Any of a number of known processes may be employed to recover the PGM's from the solution.

One method is the extraction of platinum from the leach filtrate by means of adsorption on activated carbon.

The activated carbon was obtained from Calgon Carbon Corporation type GRC 20, 6×12 mesh, and was used as received.

In determining the maximum loading capacity of the activated carbon, a platinum solution was prepared by adding dissolved platinum to a typical sulfuric acid leach solution, the amount of platinum in solution being 16 ppm.

Figure 3:
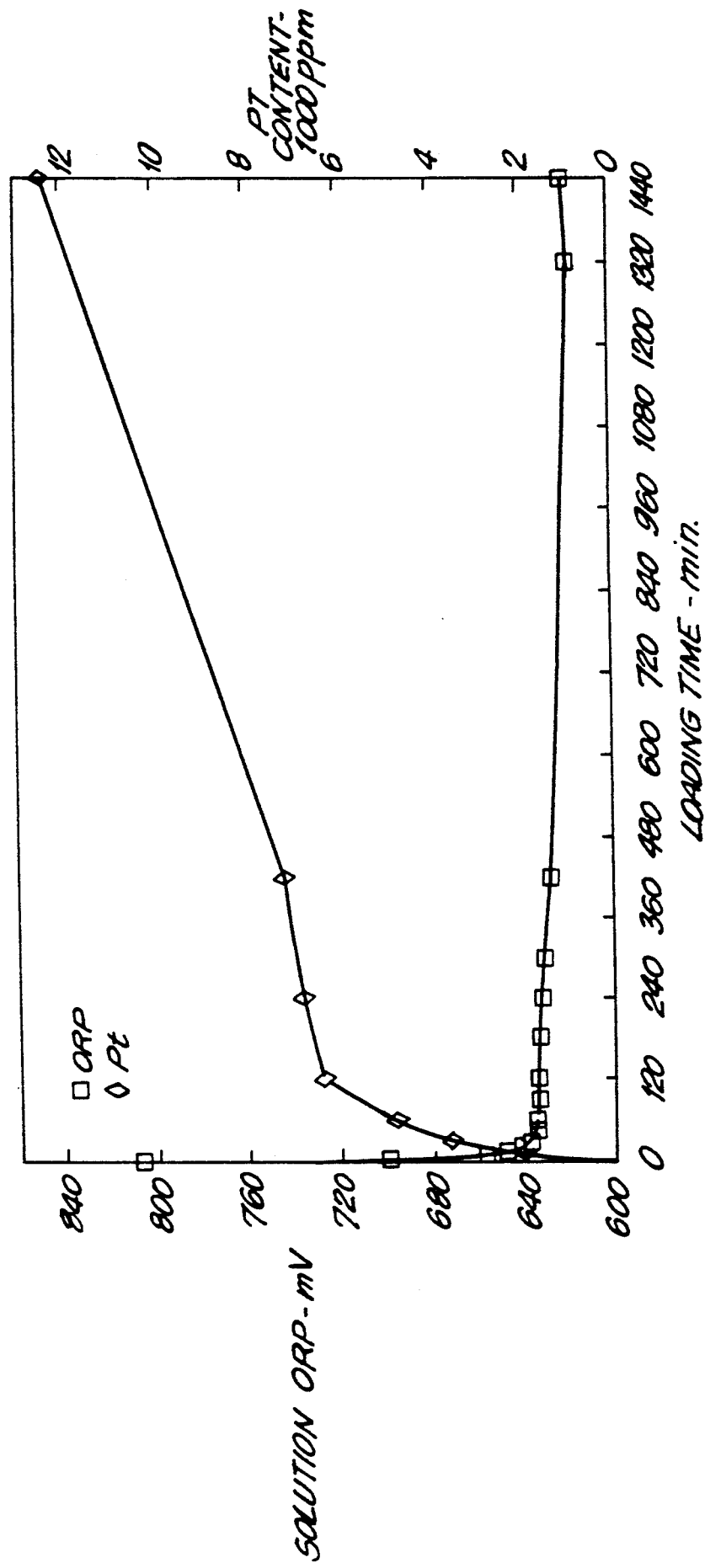
FIG. 3 shows a curve illustrating the loading of platinum from a synthetically prepared solution onto activated carbon.

The maximum loading on the activated carbon was determined to be approximately 12,000 ppm as shown in FIG. 3. The solution had a volume of 4 liters and the amount of carbon added was 1 gram.

Over 50% of the platinum was loaded on the Calgon carbon as received after 6 hours (360 minutes). The redox potential dropped from above 800 mV and remained relatively constant at 620 mV. An analysis of the carbon after being in the platinum solution for 8 days showed a platinum content of 15,000 ppm.

Carbon loading of platinum was tested with a solution prepared by dissolving platinum sponge in a solution containing $H_2SO_4$, NaBr and Geobrom. The composition of the solution was 10.2 mg/l Pt, 50 gpl $H_2SO_4$, 10 gpl NaBr and 4.5 gpl Geobrom 3400.

Figure 4:
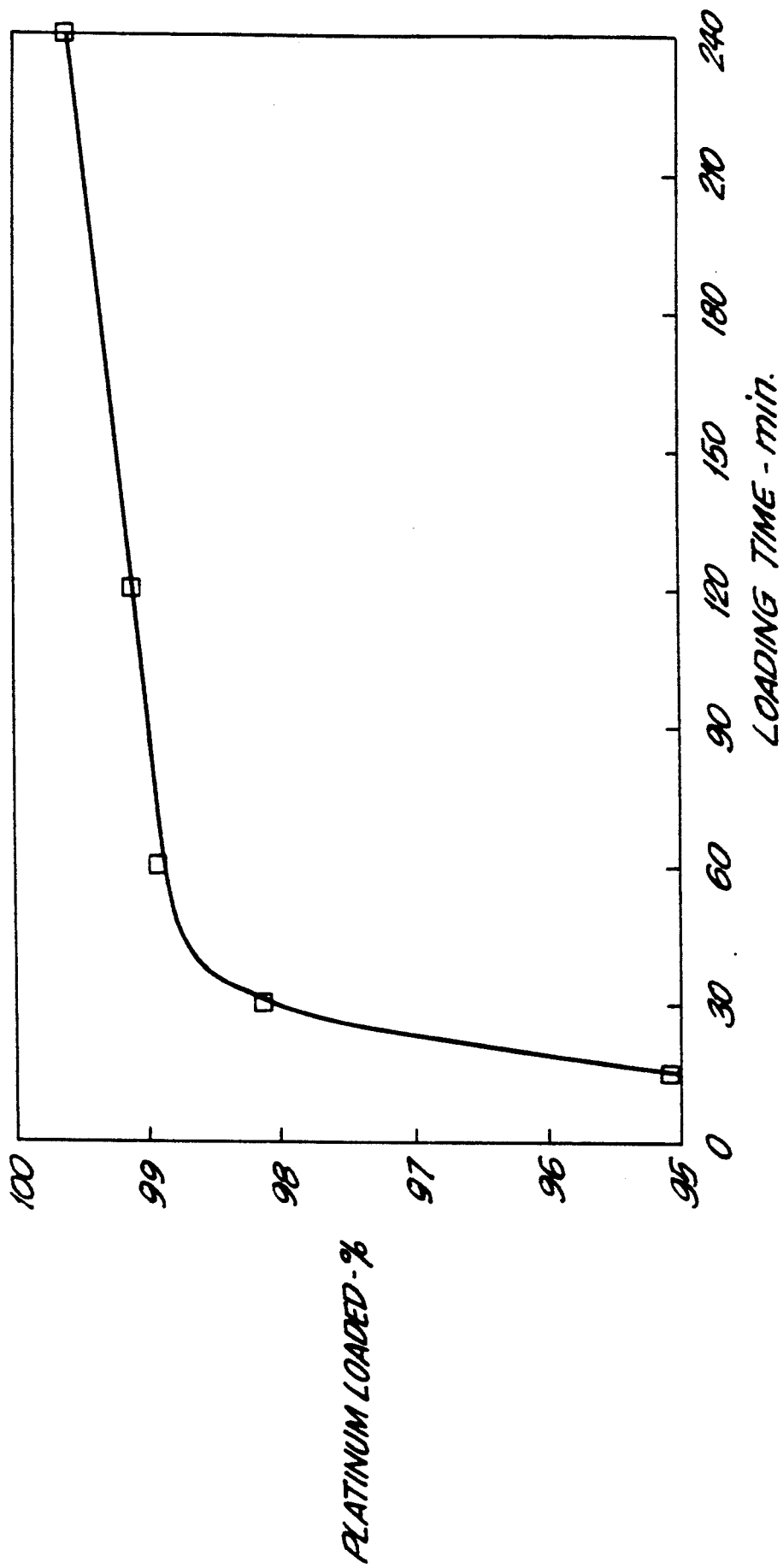
FIG. 4 depicts loading of platinum on activated carbon from a leachable containing platinum.

The solution (200 ml) was contacted with 5 grams of activated carbon (6×12 mesh). Over 95% of the platinum was adsorbed by the carbon after the first 30 minutes as shown in FIG. 4 and 99% after 1 hour.

The platinum can also be recovered from the filtrate of the pregnant leach solution by adsorption on an ion exchange resin selective to the adsorption of platinum.

A common resin is one sold under the trademark Dowex-21K produced by The Dow Chemical Corporation. It is a strong-base resin containing tri-methyl-amine functional groups with a copolymer of styrene and divinyl benzene matrix.

The elution solution was a mixture of acetone and 1M HCl with a volume ratio of 3:1. The mechanism of adsorption and elution is given below:

Adsorption

$$2R-Cl^- + PtBr_6^{2-} \longrightarrow 2R-(PtBr_6)^{2-} + 2Cl^-$$

Elution

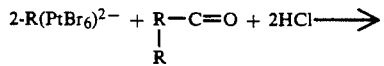

$$2\text{-}R(PtBr_6)^{2-} + R-\underset{R}{\overset{|}{C}}=O + 2HCl \longrightarrow$$

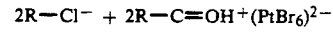

$$2R-Cl^- + 2R-C=OH^+(PtBr_6)^{2-}$$

Figure 5:
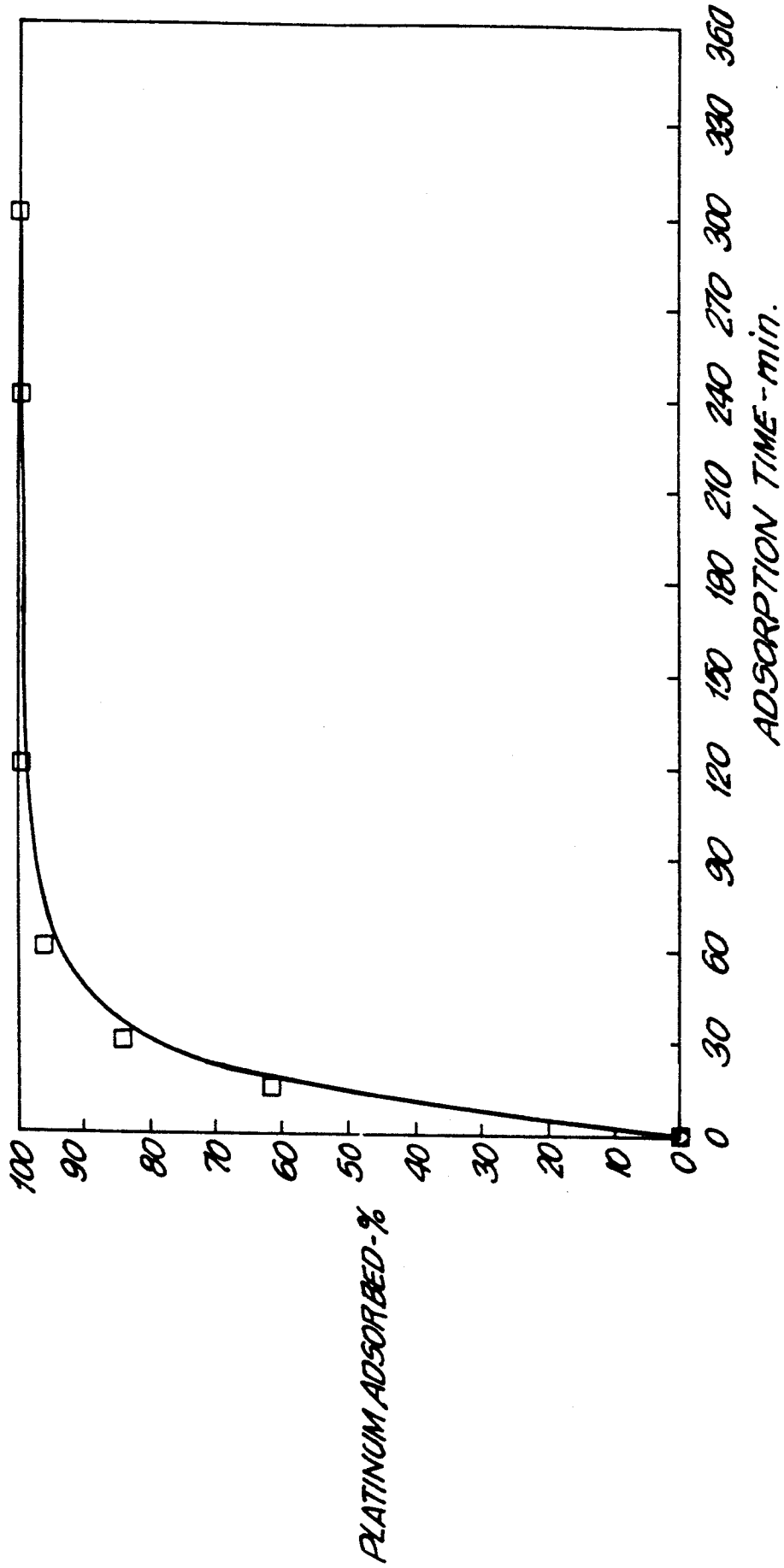
FIG. 5 shows a curve illustrating the adsorption of platinum on an ion exchange resin selective to the adsorption of platinum.

In loading the resin with the pregnant filtrate solution containing 4 mg/l platinum, 50 gpl $H_2SO_4$ and 10 gpl NaBr, one gram of resin was added to 500 ml of leached solution. About 90% of the platinum was loaded in 2 hours and 98% in 4 hours at room temperature as shown in FIG. 5.

Following removal of the precious metal from the pregnant filtrate, the filtrate depleted in precious metal is preferably recycled to the leaching operation.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A method for recovering from an ore at least one platinum group metal selected from the group consisting of platinum, palladium, rhodium and ruthenium, said platinum group metal being disseminated throughout said ore in at least one form selected from the group consisting of said platinum group metal in the elemental state, ferro-alloys of said platinum group metal and at least one platinum group metal compound selected from the group consisting of sulfides, arsenides, tellurides, selenides, antimonides, and bismuthinides, which comprises:

reducing the particle size of said ore to a size sufficient to provide said platinum group metal in a leachable condition, and subjecting said ore to leaching with a sulfuric acid solution maintained at a pH of less than about 1 during leaching, said solution containing an amount of a soluble bromide compound at least sufficient to form a soluble platinum group metal bromide complex while maintaining an amount of an oxidizing agent dissolved in said solution at least sufficient to provide a redox potential of at least about 700 mv as determined against a Standard Calomel Electrode (SCE) to maintain said platinum group metal in an ionic form conducive to forming a soluble bromide complex, thereby dissolving substantial amounts of said at least one of said platinum group metals and form a solution thereof, and recovering a product predominantly of said platinum group metal from said solution.

2. The method of claim 1, wherein the leachability of said platinum group metal in said ore is further enhanced by roasting the ore at an elevated temperature ranging from about 275° C. to 750° C., wherein said oxidizing agent is bromine, and wherein said soluble bromide compound is an alkali metal bromide.

3. The method of claim 2, wherein said ore is roasted at an elevated temperature ranging from about 275° to 450°0 C., and wherein said alkali metal bromide is sodium bromide.

4. The method of claim 2, wherein said ore is an oxide ore containing iron in the ferrous state which is oxidized to the ferric state during roasting hereby conserving the oxidizing agent during the leaching operation.

5. The method of claim 1, wherein said ore is oxidized in an aqueous sulfuric acid solution at elevated temperature and pressure in an autoclave in the presence of an oxidizing gas.

6. A method for recovering from an ore at least one platinum group metal selected from the group consisting of platinum, palladium, rhodium and ruthenium, said platinum group metal being disseminated through said ore in at least one form selected from the group consisting of said platinum group metal in the elemental state, ferro-alloys of said platinum group metal and at least one platinum group metal compound selected from the group consisting of sulfides, arsenides, tellurides, selenides, antimonides, and bismuthinides, which comprises:

reducing the particle size of said ore to a size less than about 100 mesh;

roasting said ore at an elevated temperature of about 275° C. to 750° C. sufficient to free up occluded platinum group metal in said ore and to decompose by oxidation any platinum group metal compounds present in said ore thereby rendering said platinum group metal leachable, and subjecting said ore to leaching with a sulfuric acid solution maintained at a pH of less than about 1 during leaching, said solution containing an amount of a soluble bromide compound at least sufficient to form a soluble platinum group metal bromide complex while maintaining an amount of an oxidizing agent in said solution at least sufficient to provide a redox potential of at least about 700 mv as determined against Standard Calomel Electrode (SCE) to maintain said platinum group metal in an ionic form conducive to forming a soluble bromide complex, thereby dissolving substantial amounts of said at least one platinum group metal and form a solution thereof, and recovering a product predominantly of said platinum group metal from said solution.

7. The method of claim 6, wherein said roasting temperature ranges from about 275° C. to 450° C., wherein said oxidizing agent is bromine, and wherein the bromide compound is an alkali metal compound.

8. The method of claim 6, wherein said ore is an oxide ore containing iron in the ferrous state which is oxidized to the ferric state during roasting thereby conserving said oxidizing agent.

9. The method of claim 6, wherein following dissolution of the platinum group metal from the ore, the solution is separated from the leached ore to provide a filtrate thereof and the platinum group metal recovered from the filtrate by the adsorption thereof on activated carbon.

10. The method of claim 6, wherein following dissolution of platinum group metal from the ore, the solution is separated from the leached ore to provide a filtrate thereof and the platinum group metal recovered from the filtrate by the adsorption thereof on an ion exchange resin selective to the adsorption of said precious metal.

11. The method of claim 6, wherein following dissolution of the platinum group metal from the ore, the solution is separated from the leached ore to provide a filtrate thereof, the platinum group metal thereafter recovered from the filtrate leaving a further filtrate depleted of platinum group metal, and the depleted filtrate recycled to the leaching operation.

* * * * *